United States Patent
Kim et al.

(10) Patent No.: US 11,299,125 B2
(45) Date of Patent: Apr. 12, 2022

(54) ADAS-LINKED ACTIVE HOOD APPARATUS FOR ALWAYS-ON OPERATION

(71) Applicants: Hyundai Motor Company, Seoul (KR); Kia Motors Corporation, Seoul (KR)

(72) Inventors: Sang Il Kim, Gyeonggi-do (KR); Seung Wan Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 391 days.

(21) Appl. No.: 16/568,940

(22) Filed: Sep. 12, 2019

(65) Prior Publication Data

US 2020/0108793 A1 Apr. 9, 2020

(30) Foreign Application Priority Data

Oct. 5, 2018 (KR) .................... 10-2018-0119081

(51) Int. Cl.
| | | |
|---|---|---|
| *B60R 21/38* | (2011.01) | |
| *B60R 21/0134* | (2006.01) | |
| *B60W 40/02* | (2006.01) | |

(52) U.S. Cl.
CPC .......... *B60R 21/38* (2013.01); *B60R 21/0134* (2013.01); *B60W 40/02* (2013.01); *B60W 2420/52* (2013.01); *B60W 2554/00* (2020.02)

(58) Field of Classification Search
CPC ............... B60R 21/38; B60R 21/0134; B60R 2021/343; B60W 40/02; B60W 2420/52; B60W 2554/00; B60W 30/08; B62D 25/12
See application file for complete search history.

(56) References Cited

U.S. PATENT DOCUMENTS

| | | | | |
|---|---|---|---|---|
| 7,506,716 | B1* | 3/2009 | Salmon | B60R 21/38 |
| | | | | 180/274 |
| 9,308,886 | B1* | 4/2016 | Hwang | B60R 21/38 |
| 10,118,587 | B2* | 11/2018 | Czechtizky | E05D 3/06 |
| 10,239,484 | B2* | 3/2019 | Hwang | B62D 25/12 |
| 10,703,326 | B2* | 7/2020 | Gabler | B62D 25/12 |
| 10,752,201 | B2* | 8/2020 | Fredriksson | B60R 21/38 |
| 2007/0080010 | A1* | 4/2007 | Gust | B60R 21/38 |
| | | | | 180/69.2 |

(Continued)

FOREIGN PATENT DOCUMENTS

| | | | | |
|---|---|---|---|---|
| FR | 2910872 A1 * | 7/2008 | | B60R 21/38 |
| KR | 101510011 B1 | 4/2015 | | |

(Continued)

*Primary Examiner* — Jonathan Ng
*Assistant Examiner* — Scott F. Underwood
(74) *Attorney, Agent, or Firm* — Mintz Levin Cohn Ferris Glovsky and Popeo, P.C.; Peter F. Corless

(57) ABSTRACT

An ADAS-linked active hood apparatus for always-on operation is provided. The apparatus includes a hinge arm that is connected to a hood of a vehicle, a stationary bracket that is fixed to a vehicle body, and a rotary bracket that rotates about a pivot pin of the stationary bracket. A first link interconnects the rotary bracket and the hinge arm and a spindle is integrally connected to the rotary bracket. A controller receives driving information of the vehicle via an ADAS and adjusts a pop-up height of the hood when a collision is expected based on the received driving information.

8 Claims, 3 Drawing Sheets

[ BEFORE ROTATION ]

[ AFTER ROTATION ]

(56) References Cited

U.S. PATENT DOCUMENTS

| | | | | |
|---|---|---|---|---|
| 2013/0020141 A1* | 1/2013 | Hwang | ................... | B60R 21/38 |
| | | | | 180/69.21 |
| 2015/0167369 A1* | 6/2015 | Hwang | ................... | B60R 21/38 |
| | | | | 16/233 |
| 2016/0090061 A1* | 3/2016 | Hwang | ................... | B60R 21/38 |
| | | | | 180/274 |
| 2017/0113648 A1* | 4/2017 | Kim | ...................... | E05D 5/0207 |
| 2017/0259776 A1* | 9/2017 | McLundie | .............. | B60R 21/38 |
| 2018/0057068 A1* | 3/2018 | Leschnik | ................ | B62D 25/12 |
| 2018/0141516 A1* | 5/2018 | Hwang | ................... | E05D 3/145 |
| 2018/0179799 A1* | 6/2018 | Waskie | ................... | B62D 25/12 |
| 2020/0139927 A1* | 5/2020 | Kim | ........................ | E05B 77/08 |
| 2020/0141164 A1* | 5/2020 | Kim | ..................... | B62D 25/105 |
| 2020/0165851 A1* | 5/2020 | Page | ........................ | E05D 3/145 |

FOREIGN PATENT DOCUMENTS

| | | | | |
|---|---|---|---|---|
| KR | 101743012 B1 * | 6/2017 | | |
| WO | WO-2020210897 A1 * | 10/2020 | ............. | B60R 21/38 |

* cited by examiner

[ BEFORE ROTATION ]   [ AFTER ROTATION ]

ADAS-LINKED ACTIVE HOOD APPARATUS FOR ALWAYS-ON OPERATION

CROSS-REFERENCE TO RELATED APPLICATION

This application claims under 35 U.S.C. § 119(a) the benefit of priority to Korean Patent Application No. 10-2018-0119081 filed on Oct. 5, 2018, the entire contents of which are incorporated herein by reference.

BACKGROUND

(a) Technical Field

The present disclosure relates to an advanced driving assistance system (ADAS)-linked active hood apparatus for always-on operation, and more particularly, to an active hood that is capable of operating at all times according to vehicle driving by receiving ADAS information and setting an increase (pop-up amount) of a spindle fixed to a vehicle body based on the received information.

(b) Background Art

With the recent advancement of technology for autonomous vehicles, the field of safety associated with active or passive autonomous driving is in the spotlight. Moreover, an advanced driving assistance system (ADAS) is being developed as a technology for autonomous driving of vehicles.

An ADAS is a high-tech driver assistance system for assisting a driver in driving a vehicle, and is configured to sense a situation ahead of a vehicle, determine the situation based on the sensing result, and control the behavior of the vehicle based on the determined situation. For example, an ADAS sensor device is capable of detecting a foregoing vehicle and driving lanes. Then, when a target lane, a target speed, or a foregoing target is determined, the ADAS controls, for example, electrical stability control (ESC) of a vehicle, an engine management system (EMS), or motor driven power steering (MDPS).

As a representative example, the ADAS may be realized by an automatic parking system, a low-speed urban driving assistance system, or a blind-spot warning system. The ADAS sensor device for sensing a situation ahead of the vehicle may be, for example, a global positioning system (GPS) sensor, a laser scanner, a front radar, or a Lidar, the most representative one being a front camera configured to capture an image of the area ahead of the vehicle.

Furthermore, separate from technology for autonomous driving, recently, an active hood device has been developed as a hood hinge device, which connects opposite side portions of the rear end of a hood, which closes an engine room, to a vehicle body. When a collision with a pedestrian occurs, the active hood device is capable of preventing the pedestrian's head from directly colliding with a rigid vehicle structure such as an engine or a transmission.

In the related art, the active hood device is configured such that the rear end of the hood pops or lifts up via a disposable active hinge based on an operation of an actuator to secure the safety of a pedestrian during a collision. Even if a vehicle moves using an ADAS as an active autonomous driving system a collision remains possible since a vehicle is unable to avoid a collision object that appears suddenly. Therefore, it is necessary to provide a pedestrian protection device, which pops or ejects a hood upward based on the probability of a collision via the ADAS before an accident occurs. Moreover, the need for an active hood for always-on operation is increasing.

SUMMARY

The present disclosure provides an ADAS-linked active hood apparatus for always-on operation in which a controller considers the probability of a collision.

Another object of the present disclosure is to provide an ADAS-linked active hood apparatus for always-on operation in which a spindle, which is operated by a motor, sets the amount of upward movement (amount of pop-up) of a hood based on driving information received by a controller.

A further object of the present disclosure is to provide an ADAS-linked active hood apparatus for always-on operation in which an active hood, which is operated based on the probability of a collision during autonomous driving.

The objects of the present disclosure are not limited to the objects as mentioned above, and other unmentioned objects will be understood by those skilled in the art from the following description and will be more clearly appreciated by the embodiments of the present disclosure. In addition, the object of the present disclosure may be realized by devices disclosed in the claims and combinations thereof.

In an aspect, an ADAS-linked active hood apparatus for always-on operation may include a hinge arm connected to a hood of a vehicle, a stationary bracket fixed to a vehicle body, a rotary bracket configured to rotate about a pivot pin of the stationary bracket, a first link that interconnects the rotary bracket and the hinge arm, a spindle integrally connected to the rotary bracket, and a controller configured to receive driving information of the vehicle from an advanced driving assistance system (ADAS) and to adjust a pop-up height of the hood when a collision is expected based on the received driving information.

The controller may be configured to set an amount of upward movement (amount of pop-up) of the spindle based on a position of a collision object, a time-to-collision (TTC), a probability of a collision, and the collision object measured via the ADAS when the collision is expected based on the received driving information. Additionally, the controller may be configured to sort the probability of a collision into at least one stage and to set the amount of upward movement (amount of pop-up) of the spindle based on the stage of the probability of a collision. The controller may be configured to set the amount of upward movement (amount of pop-up) of the spindle based on a type of the collision object.

The ADAS-linked active hood apparatus for always-on operation may further include a pop-up link connected to the spindle to limit the pop-up height of the hood and configured to rotate the first link. The spindle, the pop-up link, and the rotary bracket may be integrally coupled to each other via a ball joint. The rotary bracket, the first link, and the spindle may be integrally connected to each other via a ball joint. The ADAS-linked active hood apparatus for always-on operation may further include a second link connected to the rotary bracket and the hinge arm.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein.

Figure 1:
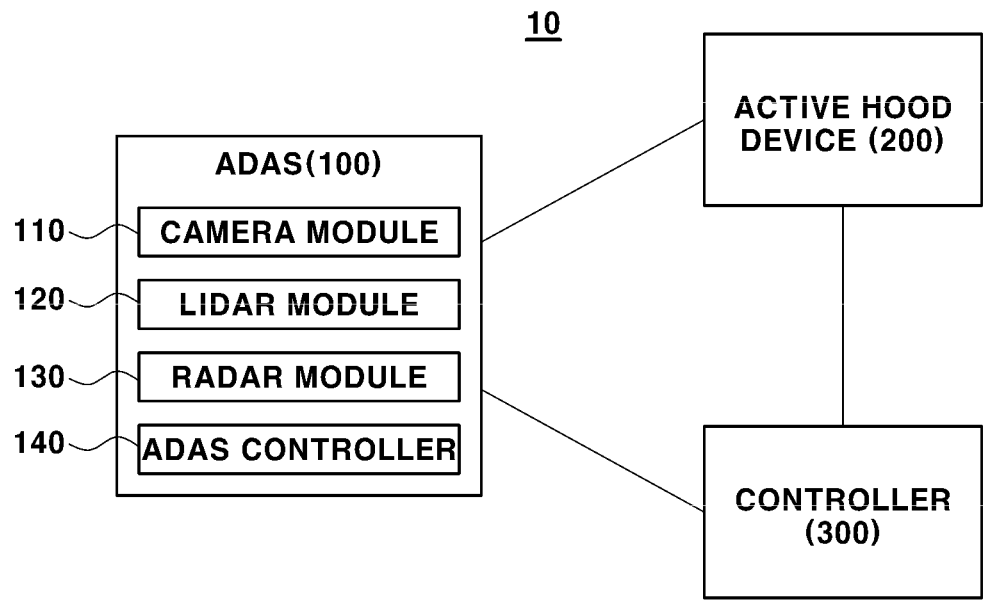
FIG. 1 is a block diagram of an ADAS-linked active hood apparatus for always-on operation according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in more detail with reference to the accompanying drawings. The exemplary embodiments of the present disclosure may be modified in various forms, and the scope of the present disclosure should not be interpreted as being limited to the following exemplary embodiments. The embodiments are provided to more completely describe the disclosure to those of ordinary skill in the art.

In addition, in this specification, the reason for dividing names of components into "first", "second", and the like is to distinguish components with the same name, and in the following description, the components are not necessarily limited in this order. In addition, in this specification, the upward direction (e.g., vertical or height direction) is the direction in which a hood is moved upwards and the downward direction is the direction in which the hood is moved downwards (e.g., toward the vehicle body), and the upward and downward directions are relative concepts based on the position of a vehicle. The active hood apparatus disclosed in this specification may be disposed on at least one end of a hood, and may be applied to any of various other positions.

The present disclosure relates to an ADAS-linked active hood apparatus for always-on operation, which is designated by reference numeral "10", and provides technology to adjust the amount of pop-up of a hood 400 at all times based on a collision risk determination algorithm during autonomous driving by an ADAS 100 or when a vehicle is driven based on information received from ADAS 100.

FIG. 1 illustrates the coupling relationship between components of the ADAS-linked active hood apparatus 10 for always-on operation according to the present disclosure. Hereinafter, the respective components will be described.

The ADAS 100 of the present disclosure may include a camera 110, a Lidar 120, and a radar 130, and may be configured to receive vehicle driving information. The ADAS 100 may further include an ADAS controller 140. The ADAS controller 140 may be configured to process vehicle driving information received from the camera, Lidar, and radar and to calculate the probability of a collision (e.g., collision risk) during driving and the time-to-collision (TTC). In another exemplary embodiment of the present disclosure, an electronic control unit (ECU) may further be provided as a high-ranking vehicle controller (e.g., upper controller). The ECU may be configured to operate the ADAS controller 140 and a pop-up controller 300 for a hood 400.

In the ADAS 100 of the present disclosure, an image sensor may be configured to sense an image of a subject or object captured via a lens, an image processor may be configured to receive and process data of the captured image from the image sensor, and the camera 110 may be configured to receive the data from the image processor. The camera 110 is configured to operate the image sensor and the image processor. Examples of such control include power supply control, reset control, clock (CLK) control, data communication control, power source control, and memory control. Meanwhile, the image processor may be configured to process data, which is sensed and output by the image sensor, and examples of this processing include enlargement of a sensed forward object and focusing on the area of an object in the entire visual-field area.

The Lidar 120 of the ADAS 100 may be connected, for example, to a Lidar device as a sensor. The Lidar device may include a laser transmission module, a laser detection module, a signal collection and processing module, and a data transmission and reception module, and may use a laser source which emits a laser within a wavelength range from about 250 nm to 11 μm or is capable of changing the wavelength of a laser. Such a Lidar device is divided into a time-of-flight (TOF) type and a phase-shift type according to a signal modulation method.

The Lidar 120 may be configured to operate the Lidar device and any other device connected to the Lidar device (e.g. a Lidar processor (not illustrated) that processes a Lidar sensing output). Examples of this control include power supply control, reset control, clock (CLK) control, data communication control, and memory control. Meanwhile, the Lidar device is used to sense an area ahead of a vehicle. Accordingly, the Lidar device may be positioned on the front side of a passenger compartment, specifically, under a windshield to transmit and receive a laser through the windshield.

The radar 130 of the ADAS 100 may be connected, for example, to a radar device as a sensor. The radar device may be a sensor configured to measure the distance to an object or the speed or angle of the object using electromagnetic waves. Through the use of the radar device, an object up to about 150 m ahead within a horizontal angular range of about 30 degrees may be sensed using frequency modulation carrier waves (FMCW) or pulse carrier waves. The radar 130 may be configured to operate the radar device and any other device connected to the radar device (e.g. a radar processor (not illustrated) that processes a radar sensing output).

Examples of this control include power supply control, reset control, clock (CLK) control, data communication control, and memory control. Meanwhile, the radar device may typically use a band of about 77 GHz or any other appropriate band, and may be configured to sense an area ahead of the vehicle. The radar processor may be configured to process data sensed and output by the radar device, and examples of this processing include enlargement of a sensed forward object and focusing on the area of an object in the entire visual-field area.

As described above, the ADAS 100 may include the camera 110, the Lidar 120, and the radar 130, each of which may be configured to process received data, and the processed data may be transmitted to the ADAS controller 140. The ADAS controller 140 may be configured to process vehicle driving information based on the received data, and calculate the size and position of a collision object, determine the probability of a collision, and calculate the TTC. In the case of the ADAS-linked active hood apparatus 10 for always-on operation, the data processed by the ADAS controller 140 may be transmitted to the ECU as the high-ranking controller, and the ECU may be configured to adjust vertical movement of the rear end of the hood 400 based on the information received from the ADAS 100.

Figure 2:
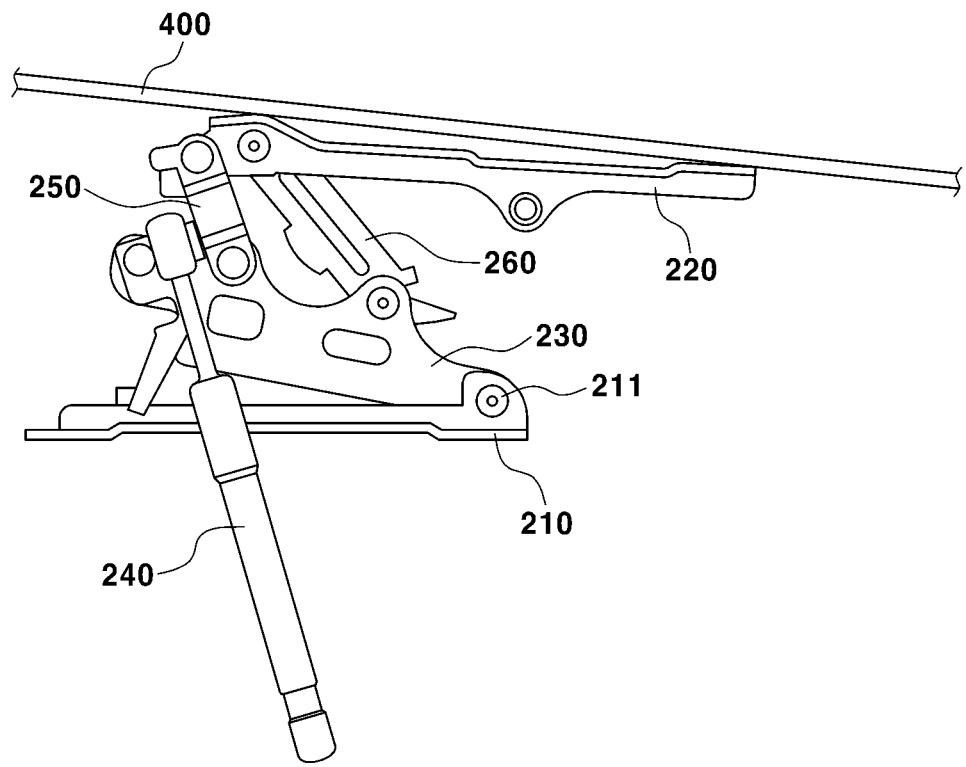
FIG. 2 is a view illustrating the configuration of the ADAS-linked active hood apparatus for always-on operation according to an exemplary embodiment of the present disclosure.
Figure 3:
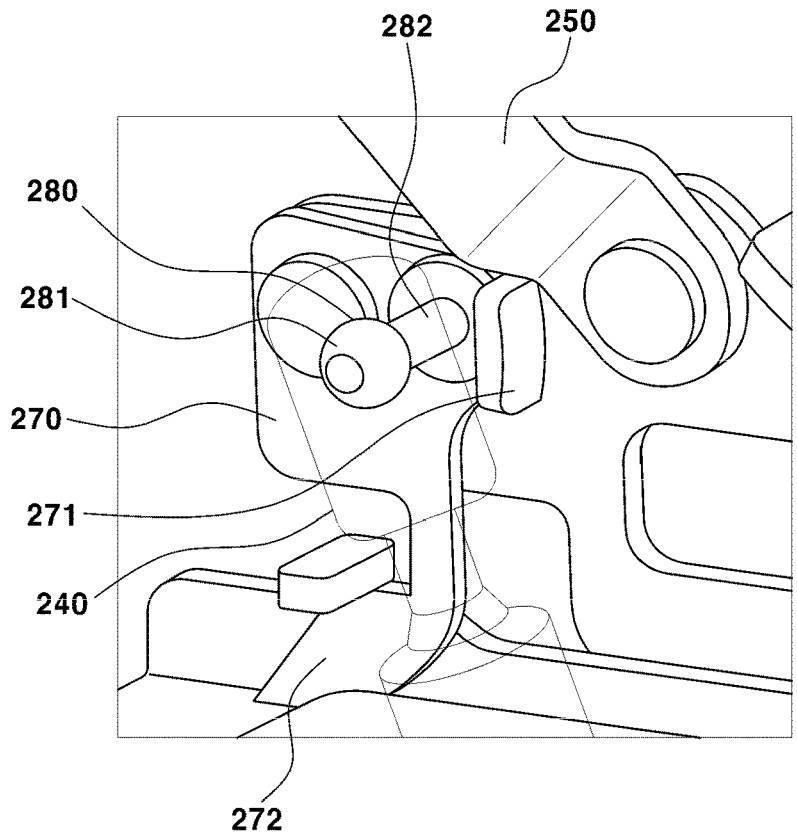
FIG. 3 is an enlarged view illustrating a pop-up link of the ADAS-linked active hood apparatus for always-on operation according to another exemplary embodiment of the present disclosure.

FIGS. 2 and 3 illustrate the configuration of an active hood device 200 of the present disclosure, which is positioned underside the hood 400 within the vehicle. As illustrated, the active hood device 200 of the present disclosure may be positioned underside the hood 400, and is configured to adjust the height of one end of the hood 400 disposed thereon via operation of a spindle 240.

The active hood device 200 may include a stationary bracket 210 fixed to a vehicle body, and a hinge arm 220 connected to the hood 400. In addition, the active hood device 200 may include a rotary bracket 230 rotated about a pivot pin 211 of the stationary bracket 210, a first link 250 which interconnects the rotary bracket 230 and the hinge arm 220, a pop-up link 270 which rotates the first link 250 to pop the hood 400 up and limits the pop-up height of the hood 400, a second link 260 disposed adjacent to the first link 250 and coupled both to the rotary bracket 230 and to the hinge arm 220, and the spindle 240 integrally connected to the rotary bracket 230.

A first end of the rotary bracket 230 may be connected to the stationary bracket 210, and the spindle 240 and the first link 250 may be respectively or integrally connected to a second end of the rotary bracket 230. Specifically, the first end of the rotary bracket 230 may be connected to the stationary bracket 210 via the pivot pin 211 to be freely rotatable. The spindle 240 may be coupled by a ball joint 280, which is integrally formed with the rotary bracket 230. The second link 260 may operate as a guide between the rotary bracket 230 and the hinge arm 220. The ball joint 280 may include a rod 282, which is configured to penetrate the rotary bracket 230 and the first link 250, and a ball 281, disposed on the distal end of the road 282 and coupled to the spindle 240. Accordingly, the rotary bracket 230 may be rotated by vertical movement of the spindle 240.

As described above, in an exemplary embodiment of the present disclosure, the first link 250 and the spindle 240 may be disposed adjacent to each other and may be respectively coupled to the rotary bracket 230. In another exemplary embodiment, all of the first link 250, the rotary bracket 230, and the spindle 240 may be coupled together by the ball joint 280. The spindle 240 may be integrally connected to a motor or an electronic actuator to receive drive power to pop the hood 400 up, and may be configured to vertically move in the height direction to rotate the rotary bracket 230.

When the rotary bracket 230 is rotated, more particularly, pivotally rotated upwards by the spindle 240, the rear end of the hood 400 may be moved upwards. However, even when the rear end of the hood 400 is moved upwards by the spindle 240, the front end of the hood 400 may remain fixed to the vehicle body. In one exemplary embodiment of the present disclosure, the rear end of the rotary bracket 230 may be rotated simultaneously when the spindle 240 is moved upwards in the height direction of the vehicle by the drive power of the motor or the electronic actuator, and the first link 250 connected to the rotary bracket 230 may be rotated together with the rotary bracket 230.

As described above, the rotary bracket 230 and the first link 250 may be rotated simultaneously by the upward movement of the spindle 240, and thus, the rear end of the hood 400 may be moved upwards to a maximum extent of about 60 mm. In another exemplary embodiment of the present disclosure, when the rotary bracket 230 is pivotally rotated upwards by the spindle 240, the first link 250 may be rotated about one end thereof, which is coupled to the rotary bracket 230, by the pop-up link 270. Accordingly, the pop-up link 270 may include a protrusion 271, which faces the first link 250. The protrusion 271 may be configured to guide the rotation of the first link 250 according to the rotation of the rotary bracket 230.

In addition, the pop-up link 270 may include a guide portion 272 configured to penetrate the stationary bracket 210, which is fixed to the vehicle body. The guide portion 272 may be provided on a first end thereof with a fixing portion to limit the pop-up height of the hood 400. When the pop-up link 270 is moved upwards, the fixing portion interferes with the stationary bracket 210 at the maximally upwardly moved height of the hood 400. The spindle 240 may be operated by the controller 300. The pop-up controller 300 may be configured to adjust the degree to which the motor or the electronic actuator is driven based on vehicle driving conditions. The controller 300, configured to operate the active hood device 200, may be operate by the ADAS controller 140 or the ECU as the high-ranking controller.

The vehicle driving conditions may be measured using a plurality of sensor units (not illustrated) mounted within the vehicle. The ADAS controller 140 or the ECU may be configured to receive data regarding the vehicle driving conditions. The controller 300 may be configured to receive vehicle driving information from the ADAS 100, and apply drive power to the spindle 240 to adjust the pop-up height of the hood 400 when a collision with an object is expected based on the received driving information. Examples of the received driving information may include the position of a collision object, the time-to-collision (TTC), the probability of a collision, and information about the collision object (e.g. height, size, and movement direction) from the ADAS controller 140. In other words, the speed and position information of the collision object may be detected by the controller to thus calculate a TTC using speed and position information of the vehicle itself.

In the present disclosure, the probability of a collision may be sorted into at least one stage. More specifically, in one exemplary embodiment of the present disclosure, the controller 300 may be configured to sort the probability of a collision into three stages to adjust the amount of upward movement (e.g., the amount of pop-up) of the active hood device 200 according to a low stage, a medium stage, and a high stage. In the low stage, the amount of upward movement (e.g., the amount of pop-up) of the hood 400 may be a lowest, and in the medium stage and the high stage, the amount of upward movement (e.g., the amount of pop-up) of the hood 400 may sequentially increase. In addition, in consideration of the fact that the position at which an impact is applied varies according to the height or size of a collision object, the controller 300 may be configured to set the amount of upward movement of the active hood device 200 according to the height of a collision object received from the ADAS 100.

Figure 4:
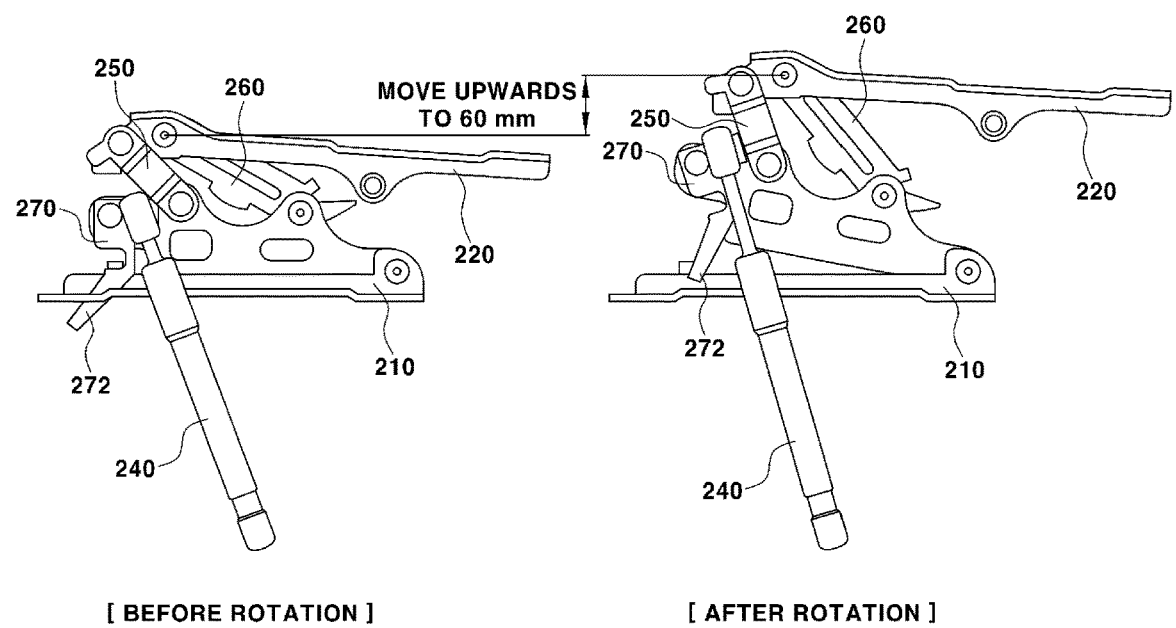
FIG. 4 is a view illustrating the operation of the ADAS-linked active hood apparatus for always-on operation according to an exemplary embodiment of the present disclosure.

FIG. 4 illustrates the vertical movement of the active hood device 200 according to one exemplary embodiment of the present disclosure. As illustrated, the hood 400 of the present disclosure may be set to be moved upwards to about 60 mm in the height direction. Hereinafter, the upward movement mechanism of the active hood device 200 will be described.

Particularly, the controller 300 may be configured to determine the probability of a collision of the vehicle based on the vehicle driving information received from the ADAS 100 and set the pop-up height of the hood 400 based on the probability of a collision. The controller 300 may be configured to operate the motor or the actuator connected to the spindle 240 to pop up the hood 400, and the spindle 240, which has received the drive power, causes rotation of the rotary bracket 230 connected thereto by the ball joint 280.

In the illustrated exemplary embodiment, the pop-up link 270 and the rotary bracket 230 may be coupled to each other by the ball joint 280, and when attempting to pivotally rotate the rotary bracket 230 upwards, the pop-up link 270 may be configured to rotate the first link 250 disposed between the rotary bracket 230 and the hinge arm 220. In another exemplary embodiment of the present disclosure, the rotary bracket 230, the spindle 240, and the first link 250 may be integrally connected to each other by the ball joint 280, and thus, the rotary bracket 230 and the first link 250 may be rotated together by the drive power applied to the spindle 240.

As described above, in the active hood device 200 of the present disclosure, the rear end of the hood 400 may be moved upwards to the sum of the amount of upward movement (the amount of pop-up) of the rotary bracket 230 and the amount of upward movement (the amount of pop-up) of the first link 250 in the height direction by the drive power applied from the spindle 240. The upward movement of the hood 400 may be adjusted by the controller 300. The controller 300 may be configured to receive driving information from the ADAS 100, and calculate the TTC based on the probability of a collision to set the upward movement height of the hood 400. In addition, the controller 300 may be configured to set the amount of pop-up of the hood 400, which is capable of minimizing an impact to be applied to a collision object, according to the size, height, and movement direction of the collision object.

In summary, the controller 300 of the ADAS-linked active hood apparatus 10 for always-on operation according to the present disclosure may be configured to specify a collision object based on driving information measured by the ADAS controller 140, to calculate the TTC based on the probability of a collision, and to set the amount of pop-up of the active hood device 200 according to the acquired conditions. Thus, the active hood device 200 of the present disclosure does not merely perform pop-up, but may operate at all times to move vertically. When no collision occurs, the rear end of the hood 400 is moved downwards.

Figure 5:
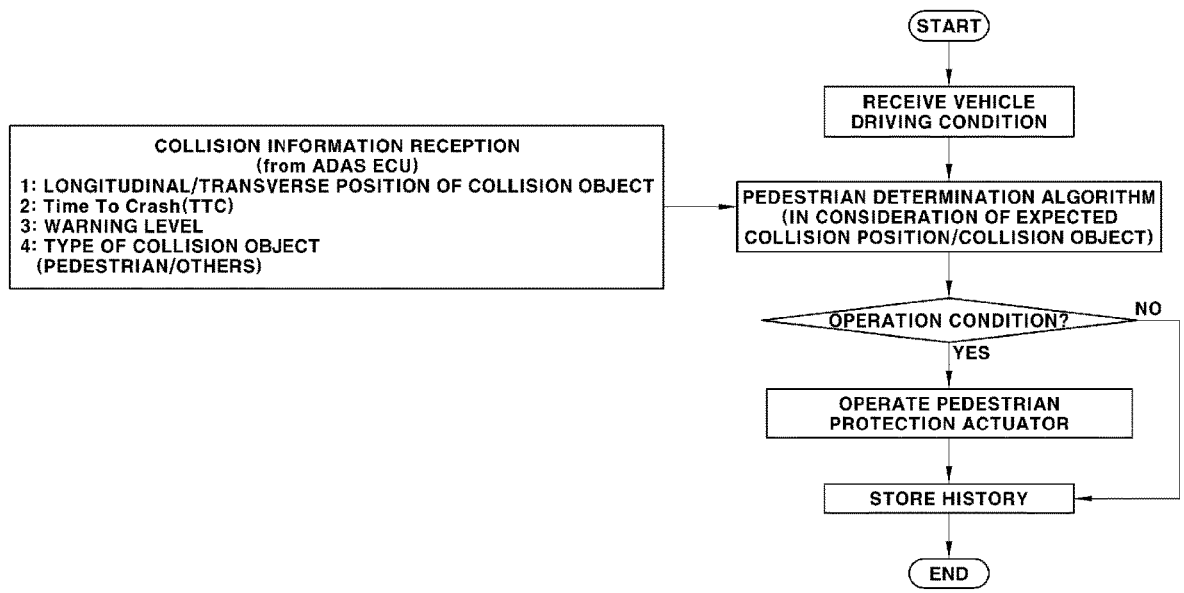
FIG. 5 is a flowchart illustrating an operating method of the ADAS-linked active hood apparatus for always-on operation according to an exemplary embodiment of the present disclosure.

FIG. 5 illustrates the flowchart of information transmitted from the ADAS 100 to the controller 300. As illustrated, the ADAS 100 may include the camera 100, the Lidar 200, the radar 130, and the ADAS controller 140 configured to receive vehicle driving information and specify the probability of a collision with a pedestrian and a collision object.

The ADAS controller 140 or the controller 300 may be configured to set the probability of a collision to at least one stage, and specify the height and size of a collision object. In addition, the ADAS controller 140 or the controller 300 may be configured to calculate the time-to-collision (TTC) as collision information. The operation condition of the hood 40 may be considered based on the received information. In response to determining that the probability of a collision is greater than a preset value, the active hood device 200 may be operated.

When setting the amount of pop-up of the active hood device 200, the controller 300 may consider the probability of a collision and/or information regarding a collision object. In addition, the controller 300 may be configured to set the amount of pop-up of the active hood device 200 in real time upon receiving information from the ADAS 100. Accordingly, the amount of pop-up of the active hood device 200 may be adjusted according to a change in driving environment.

As is apparent from the above description, the following effects may be obtained by the configuration of the aforementioned components and the coupling relationship and the operation relationship between the components. The present disclosure provides an active hood, which may be connected to and operated by an ADAS. By setting the amount of pop-up of the hood according to driving conditions, it may be possible to secure the safety of a pedestrian when a collision with a vehicle occurs. In addition, it may be possible to provide an active hood for always-on operation by a motor, rather than an active hood that is able to pop up only once.

The disclosure has been described in detail with reference to exemplary embodiments thereof. However, it will be appreciated by those skilled in the art that the present disclosure may be implemented in various modifications and alterations via, for example, addition, change or omission of constituent elements without departing from the principles and spirit of the disclosure, and these modifications and alterations are included in the scope of the present disclosure.

In addition, in the description of the embodiments of the present disclosure, a detailed description of known functions and configurations incorporated herein is omitted when it may make the subject matter of the present disclosure rather unclear. In addition, the terms used in the above description are defined in consideration of the functions in the embodiments of the present disclosure, and may be replaced by other terms based on intensions of users or operators, customs, or the like. Hence, the meanings of these terms should be based on the whole content of this specification. Accordingly, the above detailed description of the present disclosure is not intended to limit the present disclosure by the disclosed embodiments, and the accompanying claims should be construed as including other exemplary embodiments.

What is claimed is:

1. An advanced driving assistance system (ADAS)-linked active hood apparatus for always-on operation, comprising:
    a hinge arm connected to a hood of a vehicle;
    a stationary bracket fixed to a vehicle body;
    a rotary bracket configured to rotate about a pivot pin of the stationary bracket;
    a first link configured to interconnect the rotary bracket and the hinge arm;
    a spindle integrally connected to the rotary bracket; and
    a controller configured to receive driving information of the vehicle via an ADAS and to adjust a pop-up height of the hood when a collision is expected based on the received driving information.

2. The apparatus of claim 1, wherein the controller is configured to set an amount of upward movement of the spindle based on a position of a collision object, a time-to-collision (TTC), a probability of a collision, and the collision object measured by the ADAS when the collision is expected based on the received driving information.

3. The apparatus of claim 2, wherein the controller is configured to sort the probability of a collision into at least one stage and to set the amount of upward movement of the spindle based on the stage of the probability of a collision.

4. The apparatus of claim 2, wherein the controller is configured to set the amount of upward movement of the spindle based on a type of the collision object.

5. The apparatus of claim 1, further comprising:
    a pop-up link connected to the spindle to limit the pop-up height of the hood, wherein the pop-up link is configured to rotate the first link.

6. The apparatus of claim 5, wherein the spindle, the pop-up link, and the rotary bracket are integrally coupled to each other via a ball joint.

7. The apparatus of claim 1, wherein the rotary bracket, the first link, and the spindle are integrally connected to each other via a ball joint.

8. The apparatus of claim 1, further comprising:
    a second link connected to the rotary bracket and the hinge arm.

* * * * *